US006351838B1

(12) United States Patent
Amelia

(10) Patent No.: US 6,351,838 B1
(45) Date of Patent: Feb. 26, 2002

(54) MULTIDIMENSIONAL PARITY PROTECTION SYSTEM

(75) Inventor: John R. Amelia, Township of Bedminster, County of Somerset, NJ (US)

(73) Assignee: Aurora Communications, Inc, Bedminster, NJ (US)

( * ) Notice: Subject to any disclaimer, the term of this patent is extended or adjusted under 35 U.S.C. 154(b) by 0 days.

(21) Appl. No.: 09/267,847

(22) Filed: Mar. 12, 1999

(51) Int. Cl.$^7$ ............................................... G11C 29/00
(52) U.S. Cl. ...................................... 714/770; 711/114
(58) Field of Search ................................. 714/755, 770, 714/6–7, 800, 804, 799, 769, 784, 801, 20, 805, 711, 710, 24, 14; 707/202, 205; 345/327; 725/88, 92, 94–95; 711/114, 100, 101, 111, 154, 172, 122, 13, 136, 112

(56) References Cited

U.S. PATENT DOCUMENTS

| | | | | |
|---|---|---|---|---|
| 5,124,987 A | * | 6/1992 | Milligan et al. ............... | 714/7 |
| 5,271,012 A | | 12/1993 | Blaum et al. .................. | 714/6 |
| 5,351,246 A | | 9/1994 | Blaum et al. .................. | 714/6 |
| 5,412,661 A | | 5/1995 | Hao et al. ...................... | 714/6 |
| 5,530,948 A | * | 6/1996 | Islam ............................ | 714/6 |
| 5,544,339 A | | 8/1996 | Baba .......................... | 711/114 |
| 5,572,659 A | | 11/1996 | Iwasa et al. ................... | 714/6 |
| 5,774,643 A | * | 6/1998 | Lubbers et al. ............... | 714/20 |
| 5,778,426 A | * | 7/1998 | DeKoning et al. .......... | 711/122 |
| 6,154,853 A | * | 11/2000 | Kedem ......................... | 714/6 |
| 6,223,252 B1 | * | 4/2001 | Bandera et al. ............. | 711/114 |
| 6,223,323 B1 | * | 4/2001 | Wescott ...................... | 714/770 |

OTHER PUBLICATIONS

Menon, J et al. (Methods for improved update performance of disk arrays; IEEE, Jan. 7–10, 1992).*

Yeung, K.H. et al. (Dynamic parity logging disk arrays for engineering database systems; Computers and Digital Techniques, IEE Proceedings; Sep. 1997).*

Holland, M. et al. (Fast, on–line failure recovery in redundant disk arrays; The Twenty–Third International Symposium on Fault–Tolerant Computing, Jun. 22–24, 1993; Aug. 1993),*

Designing Disk Arrays for High Data Reliability Garth A. Gibson et al.

RAID–II: A High–Bandwidth Network File Server Ann L. Drapeau et al.

(List continued on next page.)

Primary Examiner—Christine T. Tu
Assistant Examiner—Guy Lamarre
(74) Attorney, Agent, or Firm—Kenneth P. Glynn

(57) ABSTRACT

A data storage system for multidimensional parity protection includes a housing for containing a plurality of conventional disk drives for storing data wherein each of the conventional data disk drives is symmetrically linked to at least three parity disk drives for guarding data stored on the data disk drives. Each of the conventional data disk drives thereby have a three dimensional parity relationship with three parity data disk drives such that a three dimensional, mirrored, orthogonal parity array is established. The data storage system further includes a failure detection component coupled to the three dimensional, mirrored, orthogonal parity arrays for detecting and indicating the failure of any disk in the mirrored, orthogonal parity arrays. In addition, a data reconstruction component is coupled to the three dimensional, mirrored orthogonal parity arrays for reconstructing data from any failed disk by combining data from other parity disks in the orthogonal parity arrays.

10 Claims, 10 Drawing Sheets

OTHER PUBLICATIONS

Report of the Working Group on Storage I/O for Large Scale Computing Garth A. Gibson et al. Nov. 1996.

Redundant Disk Arrays Reliable Parallel Secondary Storage Garth A. Gibson 1991.

Coding Techniques for Handling Failures in Large Disk Arrays Lisa Hellerstein et al.

RAID: High Performance, Reliable Secondary Storage Peter M. Chen et al.

* cited by examiner

MULTIDIMENSIONAL PARITY PROTECTION SYSTEM

BACKGROUND OF THE INVENTION

1. Field of the Invention

The present invention relates to data storage systems for multidimensional parity protection, and more particularly to data storage systems for multidimensional parity protection which may be created independently of existing systems and which may be created to be retrofittable to existing multiple drive disk systems. The invention includes a housing containing a plurality of parity disk drives for guarding data stored on conventional data disk drives with means for data reconstruction of data from conventional disk drives such that a multidimensional, mirrored, orthogonal parity array is established.

2. Information Disclosure Statement

The following patents describe the state of the art in relevant data storage systems:

U.S. Pat. No. 5,271,012 to Blaum et al. teaches a method and means for encoding data written onto an array of M synchronous DASDs and for rebuilding onto spare DASD array capacity when up to two array DASD fail. Data is mapped into the DASD array using an (M−1) *M data array as the storage model where M is a prime number. Pairs of simple parities are recursively encoded over data in respective diagonal major and intersecting row major order array directions. The encoding traverse covers a topologically cylindrical path.

U.S. Pat. No. 5,351,246 to Blaum et al. teaches a method and means for coding an (M−1) *M data array written onto an array of M synchronous recording paths and for rebuilding and writing onto spare recording path capacity when up to a preselected number R of array DASDs fail, or one DASD becomes erroneous and up to R−2 fail. Data is mapped into the parallel paths using and (M−1)*M data and parity block array as the storage model where M is a prime number and each block extent is uniform and at least one bit in length. The (M−1)*M data and parity block array is encoded to include zero XOR sums along a traverse of slopes 0,1,2, . . . , P−1, extended cyclically over the data array.

U.S. Pat. No. 5,412,661 to Hao et al. teaches a data storage system architecture having an array of small data storage disks, organized into logical rows and columns, with each disk coupled to two disk controllers via two independent controller-disk interconnects. No two disks are coupled to the same pair of controllers. The component disks are arranged in parity groups of variable size. Within each parity group, failure of one disk sector can be recovered through data reconstruction using data from other disks in the parity group. One or more of the disks can be reserved as hot standbys for substitution on failure, automatically replacing any failed disk.

U.S. Pat. No. 5,572,659 to Iwasa et al. teaches an adapter connected between a host computer and disk storage devices providing interfaces for connecting to the host computer and the disk storage devices having the same interface design. The adapter includes control means for building a redundant disk storage system and includes means for detecting and indicating a failed disk storage device, means for replacing the failed disk storage device and means for rebuilding a redundant disk storage system after the replacement of disk storage devices.

U.S. Pat. No. 5,544,339 to Baba teaches an array of disk drives for storing information which is accessed through multiple channels by a host computer. Different channels are coupled to different sequences of disk drives. Different disk drives can be accessed simultaneously through different channels, enabling high data transfer rates. The same disk drive can be accessed through two different channels, enabling access even if one of the channels is busy or malfunctioning. In one case, the channels are divided into at least two mutually exclusive sets of channels, each set providing access to all of the disk drives.

A text by Garth A. Gibson and David A. Patterson entitled, "Designing Disk Arrays for High Data Reliability", a text by Peter M. Chen and Garth A. Gibson entitled, "RAID-II: A High-Bandwidth Network File Server", a text by Garth A Gibson and Jeffrey Scott Vitter and John Wilkes entitled, "Report of the Working Group on Storage I/O for Large Scale Computing", a text by Garth A. Gibson entitled, "Redundant Disk Arrays, Reliable, Parallel Secondary Storage" and a text by Garth A. Gibson, Lisa Hellerstein, Richard M. Karp, Randy H. Katz and David A. Patterson entitled, "Coding Techniques for Handling Failures in Large Disk Arrays," describes various types of storage protection and secondary disk arrays.

Notwithstanding the foregoing, the prior art neither teaches nor suggests a data storage system for multidimensional parity protection including for retrofit or use with a plurality of conventional disk drives for storing data wherein each of the conventional data disk drives is symmetrically linked to at least three parity disk drives for guarding data stored on the data disk drives, as taught by the present invention.

SUMMARY OF THE INVENTION

A data storage system for multidimensional parity protection includes a housing for containing a plurality parity disk drives for guarding data stored on a plurality of conventional data disk drives. Each of the conventional data disk drives are connected with the parity disk drives so as to create a multidimensional parity relationship in excess of two dimensions, with the plurality of parity data disk drives such that a multidimensional, mirrored, orthogonal parity array is established. The data storage system further includes a failure detection component coupled to the three dimensional, mirrored, orthogonal parity arrays for detecting and indicating the failure of any disk in the mirrored, orthogonal parity arrays. In addition, a data reconstruction component is coupled to the three dimensional, mirrored orthogonal parity arrays for reconstructing data from any failed disk by combining data from other parity disks in the orthogonal parity arrays.

BRIEF DESCRIPTION OF THE DRAWINGS

The present invention should be more fully understood when the specification herein is taken in conjunction with the drawings appended thereto, wherein.

DETAILED DESCRIPTION OF THE PRESENT INVENTION

Figure 1:
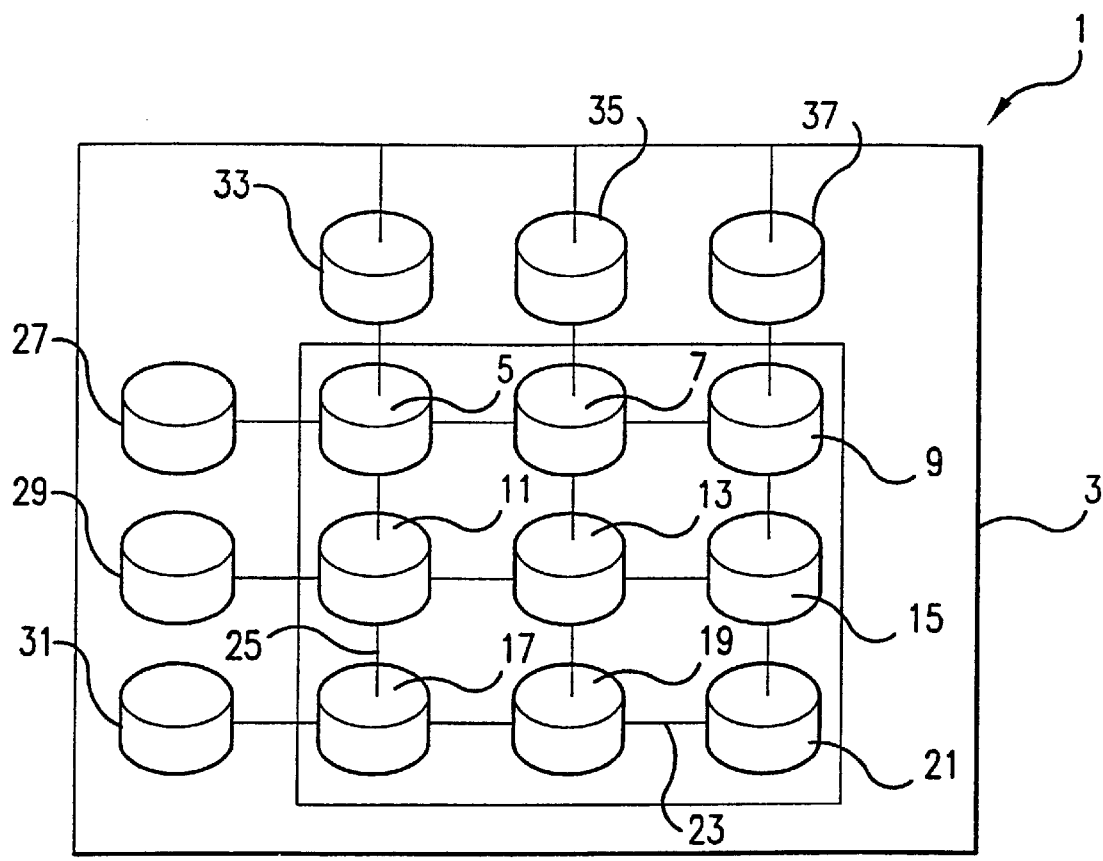
FIG. 1 shows a symmetrical two dimensional parity.

RAID is an acronym for Redundant Array of Independent (Inexpensive) Disks. It was conceived at the University of California at Berkeley. The initial RAID concept consisted of clustering small inexpensive disk drives into an array that appeared as a single large expensive drive. Testing of the initial concept found that the array of drives could deliver the same or better performance than an individual large expensive hard drive with a higher probability of any one drive of the array failing.

The increased probability of drive failure in the array of drives stimulated seven methods or levels of RAID to be defined. Each level defines a means that trades a balance of performance and data protection. Each method that provides protection does so at a cost of reduced storage capacity and performance. Several of these levels, from level 3 and above are classified as Parity RAID because the protection method utilizes parity to protect the data stored on the RAID disks.

The protection that different methods of RAID provide, is limited to a single disk failure per protection group with the exception of Level 6 that utilizes two parity drives. The number of drives that can participate in a protection group is defined by the architecture of the RAID system. Some are hardware based, some software based and others are combined hardware and software. The number of drives a single controller or a pair of tandem controllers can access restricts almost all architectures and implementation of RAID products. In short, they are providing RAID at the controller level.

This approach towards architecture for RAID products has several disadvantages. They include limited drive participation in protection groups as well as spare drives for automatic rebuild capabilities, limited data sharing capabilities and limited protection. As larger and larger quantities of storage are needed, more drives must be used. This increases the probability of multiple failures within a protection group.

In the present invention, the architecture does not implement RAID at the controller level and has the advantage of providing global sparing for any protection group. This distributed RAID architecture has higher degree of data sharing capable because it is not limited by a single or pair of controllers connectivity. It can also provide a higher degree of protection and deliver higher performance.

Storage and Network bandwidth are to some degree interchangeable. The invasion of caching products on the market is testament to that fact. Storage and Networking are moving closer and closer together. Terms such as NAS (Network Attached Storage), SAN (Storage Area Network) and Enterprise Storage all define methodologies that combine Networking and Storage and are now well known to the artisan.

The present invention is essentially a Reliable Rapid RAID system, "RRR" or "RCUBE". The present invention exploits both Networking and Storage technologies. Six basic card types provide functional features in a modular system approach; together with a plurality of housing configurations, they yield a number of different systems which may be retrofitted to existing systems or a completely independent system. At the heart of the present invention in preferred embodiments is a crosspoint switch that interconnects five of the card types. The sixth type is global memory. Each crosspoint switch port moves data at 1.5 G Bytes per second. Table I below illustrates some of the features of present invention systems, including maximum and minimum drive capabilities and storage capacities. These examples are listed in Table I as Series 1000, 3000, 5000, 7000 and 9000.

The basic card types are Global Storage Controller, Local Storage Controller, Network Storage Controller, Global Cache Controller, Management and Request Queue Controller and Global Memory. All cards except Global Memory sit on dual Message and Management Buses. The Local Storage Controllers and Network Storage Controllers have one switch fabric port. The Global Storage Controllers, Global Cache Controllers and Management and Request Queue Controllers all have two switch fabric ports.

The present invention architecture and products are based on a MPSM (Massively Parallel Storage Management) system with a total fault tolerant design. This includes system components, communication channels, power, UPS and spindles/drives. The product features a revolutionary industry first multiple drive failure survivability protection scheme.

Thus, the present invention is a data storage system for multidimensional parity protection which, in many embodiments, includes a housing for containing a plurality of conventional disk drives for storing data, wherein each of the conventional data disk drives is symmetrically or non-symmetrically linked to a plurality of parity disk drives for guarding data stored on the data disk drives. Each of the conventional data disk drives thereby have a multidimensional parity relationship with a plurality of parity data disk drives such that a multidimensional, mirrored, orthogonal parity array of at least two dimensions, and in most embodiments, at least in three dimensions, is established. In addition, a data reconstruction component is coupled to the multidimensional, mirrored orthogonal parity arrays for reconstructing data from any failed disk by combining data from other parity disks in the orthogonal parity arrays.

In one embodiment of the present invention, a data storage system for multidimensional parity protection of at least two dimensions, comprising:

(a) a housing for containing a plurality of $N^a$ conventional disk drives, wherein $N^a$ is the number of disk drives and N is greater than two, and a is an integer of at least two, representing the dimensionality of parity protection;

(b) a plurality of at least $N^a$ conventional data disk drives for storing data located within said housing;

(c) a plurality of parity disk drives equal in number to $2aN^c$, wherein a is as defined above, and c is a−1, and wherein each of said conventional data disk drives is linked to at least a number of parity disk drives equal to a, and wherein said plurality of parity disk drives are mirrored for guarding data stored on said data disk drives in a mirrored parity arrangement, each of said conventional data disk drives thereby having a multidimensional parity relationship with at least four of said parity disk drives such that multidimensional, mirrored, orthogonal parity arrays of a dimensionality are established for each of said conventional disk drives and each of said conventional disk drives are related to at least two parity disk drives in each a dimension, thereby establishing a parity group for that conventional disk drive and other conventional disk drives sharing said same at least two parity disk drives in each a dimension; and, (d) data reconstruction means coupled to each of said multidimensional, mirrored orthogonal parity arrays for reconstructing data from any failed conventional disk drive in a given parity group by combining data from other of said conventional disk drives and parity disk drives in its orthogonal parity arrays.

The data storage system of the present invention preferably includes a plurality of controller cards, each of said controller cards generating a plurality of channels, each channel being coupled to said data disk drives and said parity disk drives for accessing information therefrom and sending information thereto, at least one controller card being coupled to a channel for receiving access commands from at least one host computer and for selecting channels from among said plurality of channels to execute said access commands.

The data storage system of present invention preferred embodiments also includes:

(e) a plurality of controller cards for controlling parity functions of said plurality of parity disk drives;

(f) a plurality of first processors at a first level connected directly to said plurality of control cards, said first processors having control and processing intelligence;

(g) a plurality of second processors at a second level connected indirectly to said plurality of control cards, said first processors having control and processing intelligence; and, (h) a plurality of third processors at a third level having intelligence, said third processors being connected to at least one of said plurality of first processors and said plurality of second processors;

whereby said processors have sufficient software, memory and hardware to establish both dynamic and static hierarchical control of said plurality of parity disk drives using distributing intelligence.

In another alternative embodiment, the present invention data storage system storage system includes a plurality of controller cards, with each of the controller cards generating eight channels. Each of the channels is coupled to the data disk drives and the parity disk drives for accessing information therefrom and for sending information thereto. At least one of the controller cards is coupled to a pre-selected channel adapted for receiving access commands from at least one host computer and for selecting channels from among the other plurality of channels to execute the access commands.

In one embodiment, the data storage system includes among the plurality of controller cards, a first controller card which controls and calculates linear connection between data disk drives and parity drives in a first dimension and a second controller card which controls and calculates linear connection between data disk drives and parity drives in a second dimension and a third controller card which controls and calculates linear connection between data disk drives and parity drives in a third dimension, such that the first, second and third controller cards are linked to other controller cards so as to permit reconstruction of lost data due to failure of any one or multiple data drives.

In computer systems having many disk drives, such as tens or hundreds or more, multiple drive failure survivability required methodologies not currently in use in the industry. The design goal of data survivability with multiple drive failure will require an increasing number of drives used for protection. Looking at all the available prior art RAID levels including six, none meet desirable design goals for multiple drive failure survivability. The present invention, on the other hand is a Multidimensional Parity (MDP) system which does fulfill the stringent design goals of multiple drive failure survivability. Two staging and silent target followers allow MDP to achieve higher multiple drive failure survivability than heretofore realized.

Thus, the Multidimensional Parity (MDP) of the present invention does fulfill the design goal of multiple drive failure survivability because it does not view the data drives from a linear or single dimension perspective or a two dimension perspective. Allowing multiple parity drives to have different relationships with different subsets of data drives and with mirroring within the parity disk drive arrays, are aspects of the basics of the present invention. In the present invention, a data drive will have multiple relationships with other subsets of data drives and parity drives. This multiple relationship allows multiple drive failure survivability.

MDP is based on this multiple parity relationship in excess of two and can be classified as follows:

Symmetrical Two Dimensional Parity

Non-Symmetrical Two Dimensional Parity

Symmetrical Three Dimensional Parity

Non-Symmetrical Three Dimensional Parity

Symmetrical Multidimensional Parity above three dimensions

Non-Symmetrical multidimensional Parity above three dimensions

The non-symmetrical members of this classification are included herein, but for purposes of mathematical examples, symmetrical arrangements are illustrated. It is also possible to apply this within the scope of the present invention methodology beyond the third dimension, simply by the connective relationships between, and numbers of parity disks made available. Symmetrical Multidimensional Parity (SMDP) is not very feasible with small numbers of drives, from an economic standpoint, but becomes quickly viable as the number of data drives increases. Thus, as the number of data disk drives grows, it not only becomes feasible it becomes practical and desirable.

Historically, symmetrical Two Dimensional Parity has $N^2$ data drives and 2N parity drives. Thus, every data drive has two parity drives guarding it. The worse case survivability is the lose of the two drives. Best case survivability is the lose of 2N drives. The Storage Overhead is $2N/(N^2+2N)$. The write penalty—[read 3, write 3] is six IOs.

EXAMPLE 1

Prior Art

For 25 data disk drives, 10 parity drives are needed:

N=5, $N^2$=25, 2N=10

$5^2$ Storage Overhead=28.6

EXAMPLE 2

Prior Art

For 900 data disk drives, 60 parity drives are needed:

$N=30$, $N^2=900$, $2N=60$ $30^2$ Storage Overhead=6.25%

The worse case survivability of losing two drives will occur when the two drives in question are parity drives that guard the same data drive. Even with the loss of the two parity drives, the data is still available. The probability of losing both protection drives guarding the same data drive decreases as N increases.

In the present invention, the multidimensional parity drives and resulting array are achieved by multidimensional interconnection between the data disk drives and the parity disk drives in excess of two sets of connections, i.e., in excess of two dimensions. Thus, symmetrical Three Dimensional Parity has $N^3$ data drives and $3N^2$ parity drives. Every data drive has three parity drives guarding it. The worse case survivability is the loss of three drives. Best case survivability is the lost of $3N^2$ drives. The Storage Overhead is $3N^2/(N^{3+3}N^2)$. The write penalty—[read 4, write 4] is eight IOs.

EXAMPLE 3

Present Invention

When 512 data disk drives are used, 243 parity drives are needed to achieve three dimensional parity protection:

$N=9$, $N^3=512$, $3N^2=243$ $9^3$ Storage Overhead=25%

The worse case survivability of losing only three drives will occur when the three drives in question are parity drives that guard the same data drive. Even with the loss of the three parity drives, the data is still available. The probability of losing all three protection drives guarding a data drive is less than the $N^2$ model for Symmetrical Two Dimensional Parity and decreases even faster as N increases.

Symmetrical Four Dimensional Parity $N^4$

Symmetrical Four dimensional Parity has $N^4$ data drives and $4N^3$ parity drives. Every data drive has four parity drives guarding it. The worse case survivability is the loss of four drives. Best case survivability is the lost of $4N^3$ drives. The Storage Overhead is $4N^3/(N^{4+4}N^3)$. The write penalty—[read 5, write 5] is ten IOs.

EXAMPLE 4

Present Invention

For four dimensional parity protection, when 4,096 data disk drives are used, 2,048 parity disk drives are needed:

$N=8$, $N^4=4,096$, $4N^3=2,048$ $8^4$ Storage Overhead=33.3%

The overhead, complexity and voluminous number of drives needed to effect Symmetrical Four Dimensional Parity make it extremely expensive if a completely integrated system using specially designed data disk drives as in the prior art make it economically ineffective. However, in the present invention conventional data drives may be used and even retrofitted to make it practical.

The probability of losing all of the protection drives guarding a data drive is defined by the formula below.

$$\frac{N^D * D! * (N^D + DN^{D-1} - D)!}{(N^D + DN^{D-1})!}$$

Where N is the number of data drives in a single dimension and D is the dimension.

TABLE I

| N | DIMENSION | $N^D$ | $N^{D-1}$ | $D * N^{D-1}$ | $N^{D-1} + D * N^{D-1}$ | STORAGE OVERHEAD | INVERSE PROBABILITY |
|---|---|---|---|---|---|---|---|
| 3 | 2 | 9 | 3 | 6 | 15 | 40.00% | 12 |
| 5 | 2 | 25 | 5 | 10 | 35 | 28.57% | 24 |
| 8 | 2 | 64 | 8 | 16 | 80 | 20.00% | 49 |
| 10 | 2 | 100 | 10 | 20 | 120 | 16.67% | 71 |
| 12 | 2 | 144 | 12 | 24 | 168 | 14.29% | 97 |
| 16 | 2 | 256 | 16 | 32 | 288 | 11.11% | 161 |
| 24 | 2 | 576 | 24 | 48 | 624 | 7.69% | 337 |
| 32 | 2 | 1,024 | 32 | 64 | 1,088 | 5.88% | 577 |
| 5 | 3 | 125 | 25 | 75 | 200 | 37.50% | 10,507 |
| 6 | 3 | 216 | 36 | 108 | 324 | 33.33% | 26,002 |
| 8 | 3 | 512 | 64 | 192 | 704 | 27.27% | 113.095 |
| 10 | 3 | 1,000 | 100 | 300 | 1,300 | 23.08% | 365,322 |
| 12 | 3 | 1,728 | 144 | 432 | 2,160 | 20.00% | 970,650 |
| 5 | 4 | 625 | 125 | 500 | 1,125 | 44.44% | 106,218,506 |
| 8 | 4 | 4,096 | 512 | 2,048 | 6,144 | 33.33% | 14,481,363,072 |
| 12 | 4 | 20,736 | 1,728 | 6,912 | 27,648 | 25.00% | 1,173,881,897,472 |

The table above shows the worse case failure scenario probability of loosing a dimensional number of protection drives for different values of N and dimension. Lower probability and higher mathematics are great but in the end, Murphy's Law always rules. If you need an event not to happen then that is what will occur when you can least afford it to.

If protection drives had a higher probability of not failing than data drives this would raise the survivability MDPP (multidimensional parity protection) could afford. If protection drives could be protected by mirroring them without a performance cost than MDPP worse case survivability doubles and the probability of the event decrease depending on the dimension used and value of N. This would of course increase the storage overhead.

In the case of Symmetrical Three Dimensional Parity with N equal to eight there are 512 data drives and 192 protection drives. This case has a storage overhead of 27.27 percent. The worse case scenario is the failure of three protection drives with a probability of one in 113,095 of occurring if three drives fail. If the protection drives, were mirrored then worse case moves to losing six protection drives with a probability of one in over 1,380,000,000,000 of occurring if six drives fail. The storage overhead only increases to 42.86 percent. Best case failure moves to $6N^2$ or 384 drives.

The probability of losing all of the protection drives guarding a data drive with the protection drives mirrored is defined as follows:

$$\frac{N^D * 2D!(N^D + 2DN^{D-1} - 2D)!}{(N^D + 2DN^{D-1})!}$$

Silent Target Follower (STF)

A Silent Target Follower (STF) is in essence a mirror without the write performance cost. This can be achieved by down streaming or two staging control on the channel of drives. This will require local intelligence between the channel controller and the targets on the channel. This affords another benefit, which is it could be an upgrade or used to derive another saleable model.

Two Staging

Local intelligence between the Local Storage Controllers and the targets on the channel is what I have termed Two Staging. Two Staging will require a down stream controller from the central system embedded in the same enclosure with the drives. This is exclusive of the simple controller in the tray that provides the composite virtual drive.

The drives or targets are packaged in enclosures containing 24 trays of drives. Each tray holds two, three or four spindles to assume a virtual drive the aggregate of the spindles. The virtual drive is a single target. The enclosures have two Ultra2 SCSI buses with 12 targets on each bus. Four enclosures can be mounted into a cabinet or rack. This puts 96 targets on eight Ultra2 SCSI buses. The local controller needs to be small and provide fault tolerant redundancy.

Since the local controller is envisioned to be, a single board with redundant Ultra2 SCSI initiators fail over control will have to be upstream. The local controller cards will need to have five SCSI channels, one of which should be Fibre Channel. This provides redundancy on the eight buses with two initiators on each bus in the four enclosures and it provides four channels of Fibre channel to the upstream.

Deploying this arrangement with local controllers between the targets and upstream controllers doubles the number of drives that can be reached. The local controllers can implement STF on the buses they are attached on without any write performance to the system. A single local controller presents a channel of targets to the upstream controller.

Either an alternate means of communication between the system and the local controller is needed such as Ethernet with TCP/IP or control communication is over the SCSI channels. If control communication is over the SCSI channels this means that some vendor specific extended SCSI commands are needed. Possibly implementing the model for processor devices (see SCSI-2 specification, section 12) could server this role of control.

The present invention should be more fully understood when the specification herein is taken in conjunction with the drawings appended thereto, wherein:

FIG. 1 shows a prior art symmetrical two dimensional parity system 1 which shows a schematic arrangement wherein the outer frame 3 represents a computer system housing and peripheral operating systems hardware. Contained therein are a plurality of conventional data storage disk drives 5, 7, 9, 11, 13, 15, 17, 19 and 21. They are connected both in an X axis manner (horizontally) and in a Y axis manner (vertically) as represented by connection lines such as lines 23 and 25. Additionally, there are 6 parity disk drives 27, 29, 31, 33, 35 and 37. Theses parity disks are connected both in an X axis manner and a Y axis manner as described in conjunction with two-dimensional parity protection described above.

Figure 2:
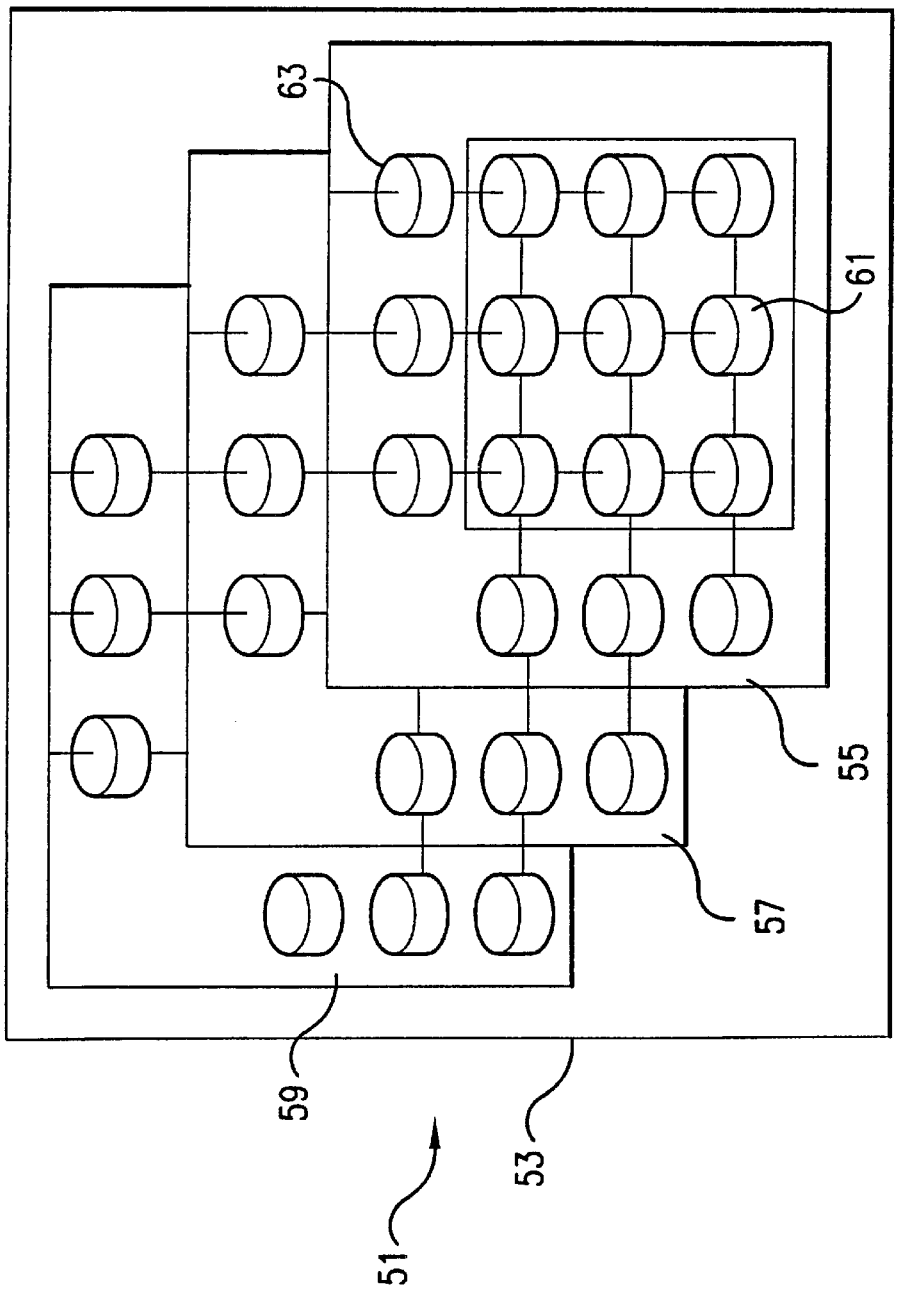
FIG. 2 shows symmetrical three dimensional parity.

FIG. 2 shows symmetrical three-dimensional parity protection system schematically as diagram 51 embodied by frame 53, with three two-dimensional planes 55, 57 and 59 with each plane containing conventional data storage disk drives such as disk drive 61 and parity protection disk drives for secondary storage data such as drive 63. In this simplified embodiment, each of the flat plane arrays 55, 57 and 59 are similar to the two-dimensional system shown in FIG. 1, and are connected similarly within each plane, but additionally, each flat plane has all of the drives connected to the other planes in a Z axis manner to create a three-dimensional parity protection system such as described above.

In preferred embodiments of the present invention system for multidimensional parity protection, the probability of losing protection drives differs in mirrored and unmirrored system. The following Tables 2 and 3 illustrate these differences.

TABLE 2

UNMIRRORED

| N | DIMENSION | STORAGE OVERHEAD | INVERSE PROBABILITY |
|---|---|---|---|
| 3 | 2 | 40.00% | 12 |
| 5 | 2 | 28.57% | 24 |
| 6 | 2 | 25.00% | 31 |
| 8 | 2 | 20.00% | 49 |
| 10 | 2 | 16.67% | 71 |
| 12 | 2 | 14.29% | 97 |
| 16 | 2 | 11.11% | 161 |
| 24 | 2 | 7.69% | 337 |
| 32 | 2 | 5.88% | 577 |
| 5 | 3 | 37.50% | 10,507 |
| 6 | 3 | 33.33% | 26,002 |
| 8 | 3 | 27.27% | 113,095 |
| 10 | 3 | 23.08% | 365,322 |
| 12 | 3 | 20.00% | 970,650 |
| 16 | 3 | 15.79% | 4,679,523 |
| 24 | 3 | 11.11% | 45,340,884 |
| 5 | 4 | 44.44% | 106,218,506 |
| 6 | 4 | 40.00% | 697,897,650 |
| 8 | 4 | 33.33% | 14,481,363,072 |
| 10 | 4 | 28.57% | 159,998,075,650 |
| 12 | 4 | 25.00% | 1,173,881,897,472 |
| 16 | 4 | 20.00% | 28,631,018,201,600 |

TABLE 3

MIRRORED

| N | DIMENSION | STORAGE OVERHEAD | INVERSE PROBABILITY |
|---|---|---|---|
| 3 | 2 | 57.14% | 665 |
| 5 | 2 | 44.44% | 5,960 |
| 6 | 2 | 40.00% | 13,545 |
| 8 | 2 | 33.33% | 51,906 |
| 10 | 2 | 28.57% | 153,296 |

TABLE 3-continued

| | | MIRRORED | |
|---|---|---|---|
| N | DIMENSION | STORAGE OVERHEAD | INVERSE PROBABILITY |
| 12 | 2 | 25.00% | 381,045 |
| 16 | 2 | 20.00% | 1,674,850 |
| 24 | 2 | 14.29% | 14,620,391 |
| 32 | 2 | 11.11% | 71,290,962 |
| 5 | 3 | 54.55% | 4,548,889,145 |
| 6 | 3 | 50.00% | 40,361,951,964 |
| 8 | 3 | 42.86% | 1,380,257,525,406 |
| 10 | 3 | 37.50% | 23,084,007,965,418 |
| 12 | 3 | 33.33% | 2.42336422E + 14 |
| 16 | 3 | 27.27% | 1.07926073E + 16 |
| 24 | 3 | 20.00% | 2.67250899E + 18 |
| 5 | 4 | 61.54% | 1.89640728E + 18 |
| 6 | 4 | 57.14% | 1.32587993E + 20 |
| 8 | 4 | 50.00% | 1.22392335E + 23 |
| 10 | 4 | 44.44% | 2.72887633E + 25 |
| 12 | 4 | 40.00% | 2.43216189E + 27 |
| 16 | 4 | 33.33% | 3.29947893E + 30 |

Figure 3:
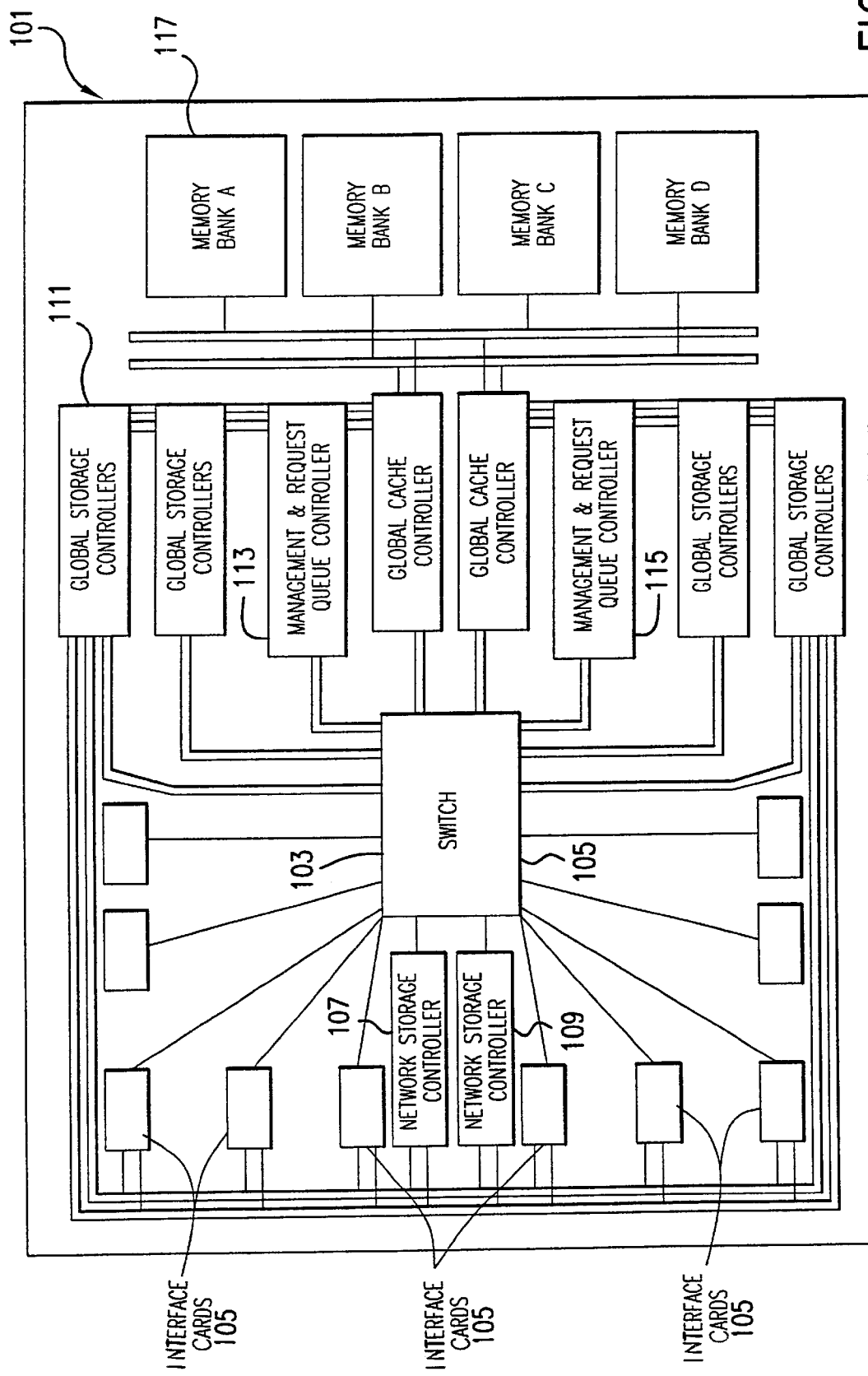
FIG. 3 shows a system overview.

FIG. 3 shows a system overview of one preferred embodiment of the present invention system 101, which includes Interface Cards such as card 105, main switch 103, Network Storage Controller 107, Network Storage Controller 109, Global Storage Controllers, such as 111, Global Cache Controllers, such as 113, Management and Request Que Controllers, such as 115 and Memory Banks, such as 117 (Memory Bank A).

In some embodiments of the present invention, referring again to Table I, direct connectivity can be as much as 288 channels of Fibre Channel, SCSI (Ultra 2), ATM (OC12 or OC48) or Gigabit Ethernet for a series 9000 system. The 7000 series supports as many as 192 channels of the same variety and the series 5000 can support up to 96 channels. The 3000 series supports as many as 72 channels of the same variety and the series 1000 can support up to 48 channels. In addition, all series allow for in-direct connectivity that provides another level of fault tolerance and doubles the number of channels providing connectivity. The channels allow for connectivity to disk drives, host and networks.

Figure 4:
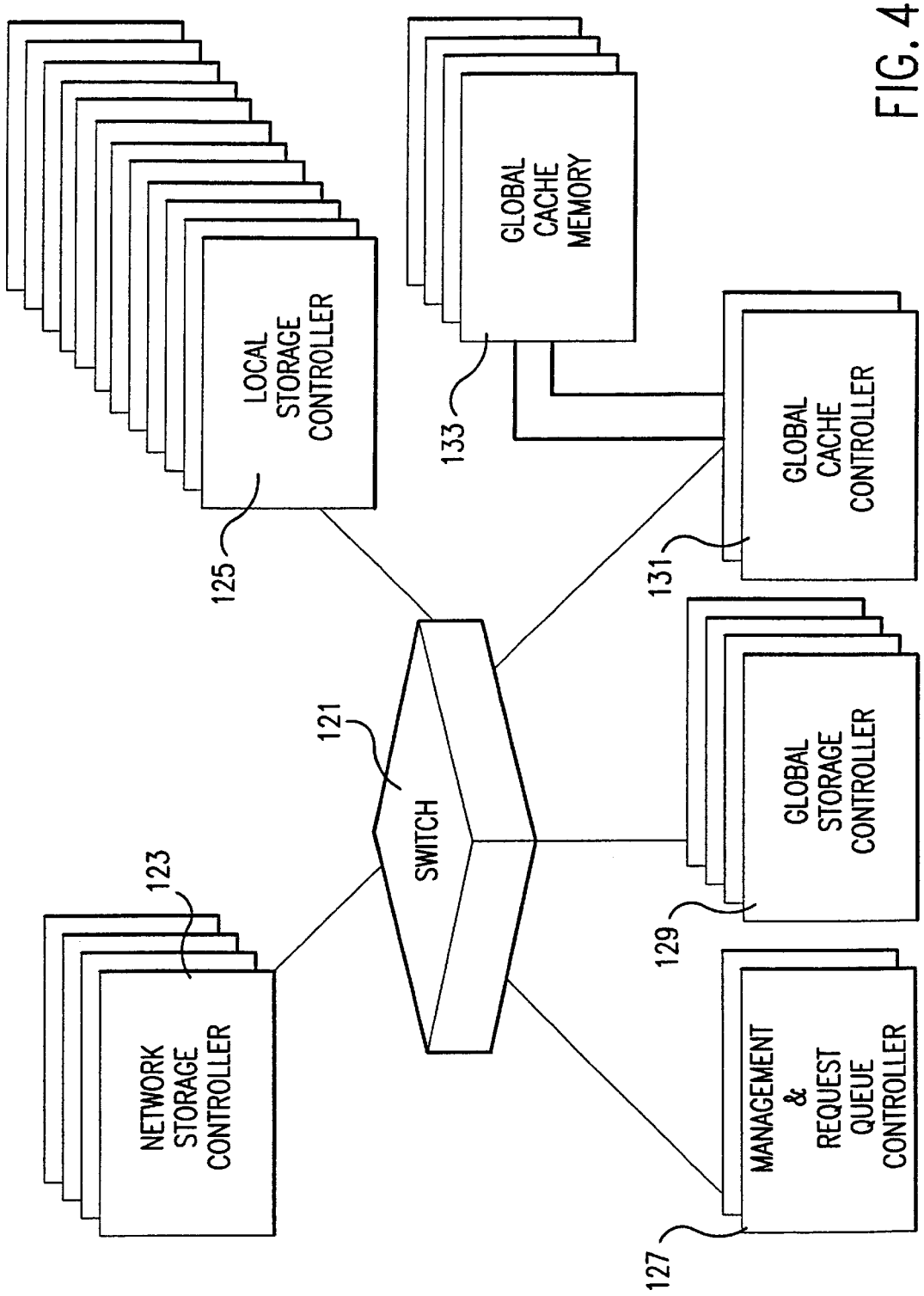
FIG. 4 shows a functional system with card interconnect.
Figure 5:
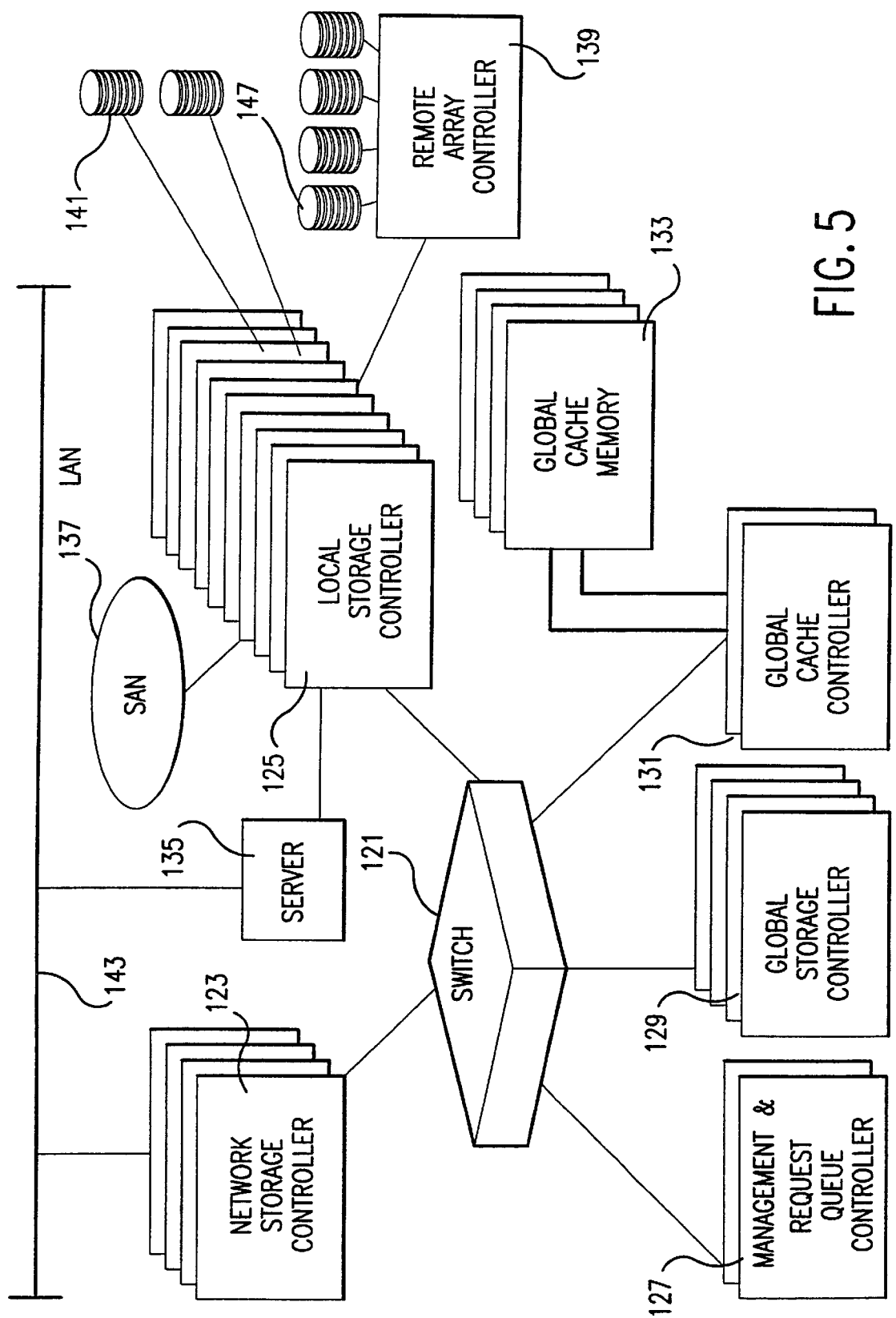
FIG. 5 shows a functional system with card interconnect with external connectivity.

Reference is made to FIG. 4 which shows a present invention functionable system with card interconnect arrangement in which switch 121 is connected to network storage controllers 123, local storage controllers 125, management and request queue controllers 127, global storage controllers 129 and global cache controllers 131, the latter of which is connected to global cache memory 133. This architecture for a present invention system is expanded upon in more detail in FIG. 5 illustrating a LAN/SAN arrangement, wherein identical parts shown in FIG. 4 are identically numbered, but here local storage controller 125 is externally connected to and operates in conjunction with server 135, SAN 137 and drives such as drive 141. Likewise, remote array controller 139 is connected to drives such as drive 147. Note also that both servers 135 and network storage controller 123 are connected to LAN 143.

Figure 6:
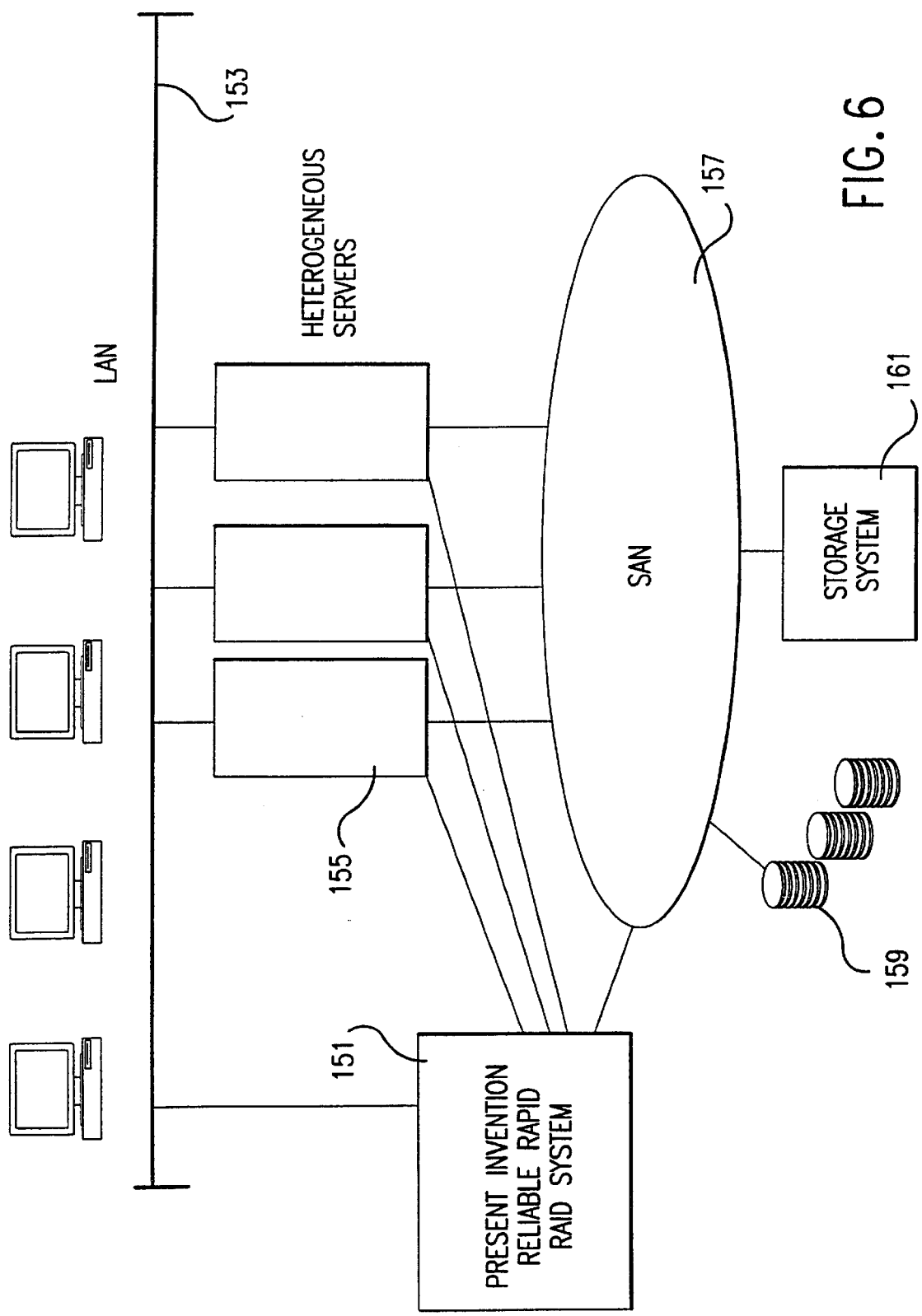
FIG. 6 shows external connectivity supporting SAN (Storage Area Network), NAT (Network Attached Storage) and conventional storage connectivity.

FIG. 6 illustrates a retrofit system wherein present invention parity protection system 151 which is illustrated in more detail above and below, is connected to LAN 153, heterogenous servers such as server 155, and SAN 157, with drives 159 and storage system 161.

Figure 7:
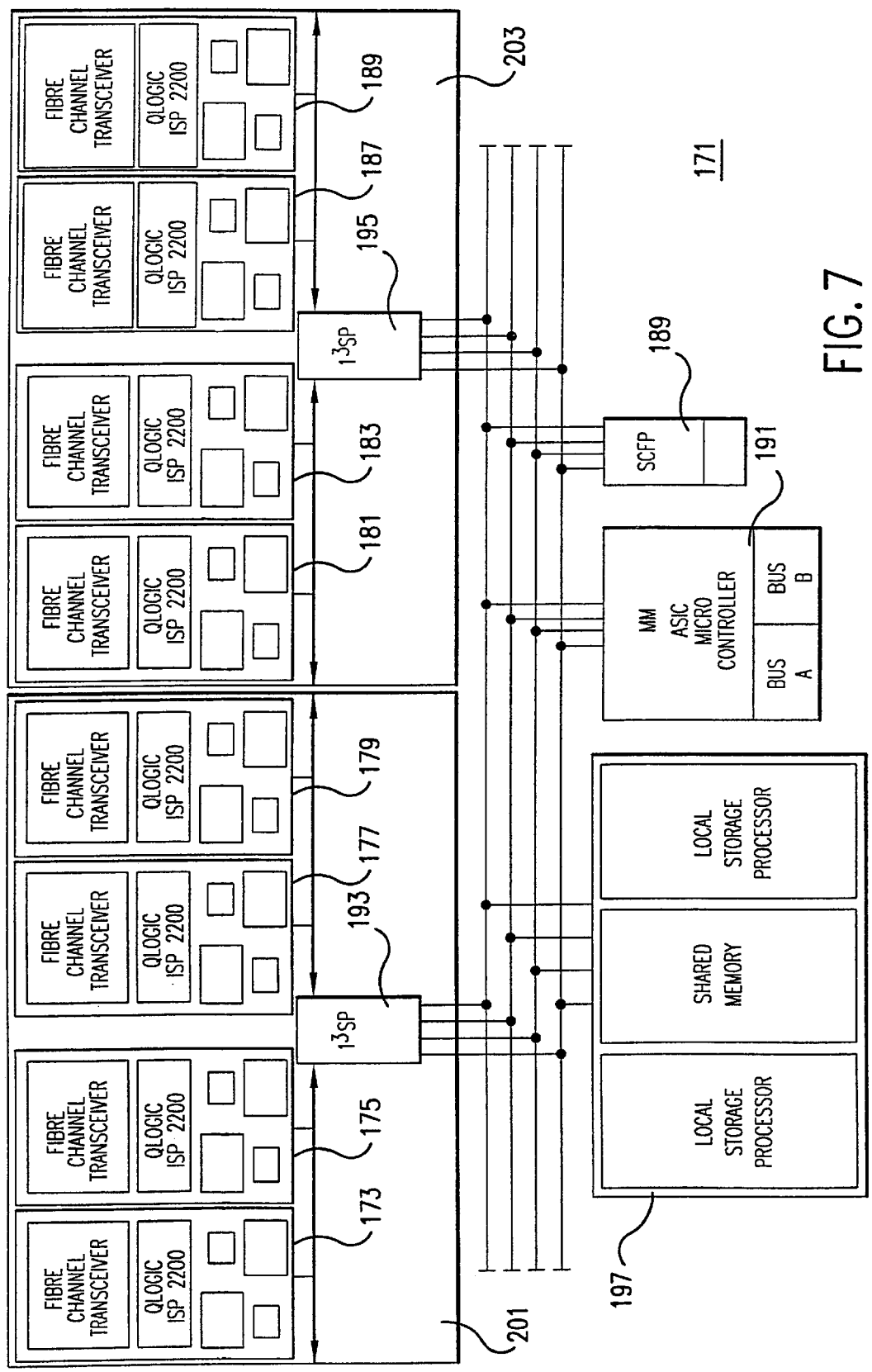
FIG. 7 shows a Fibre Channel variant of the Local Storage Controller card.

One of the variants of the Local Storage Controller Line Card which may be used in the present invention is depicted in FIG. 7 as a function block diagram 171. This variant is an eight port Fibre Channel card shown with channels 173, 175, 177, 179, 181, 183, 185 and 187. The overall system described above functions in conjunction with component processors 197. The SCFP 189 (Switch Channel Fabric Port) is the interface from the crosspoint switching fabric to the multichannel bus on the card 191. The I$^3$Sp components 193 and 195 (Intelligent Interface Slave Processor) provide bridging to and from the two PCI 2.0 64 buses and the four channels of each Qcardbus 201 and 203. This allows the memory pool to be shared by the ISP's (Intelligent SCSI Processor) that drive the Fibre Channel ports and SCSI channel buses and other elements on the card. The architecture eliminates the need for each element to have its own copy of data. In designing the memory as a resource that is available to all elements on the card latency is reduced and the level of collaboration between elements is increased.

In the present invention system, several cards work with tandem members. These include the Global Cache Controllers and Management and Request Queue Controllers. The Reflective Memory Bus allows some portion of their memory space to be reflected to the tandem member.

Figure 8:
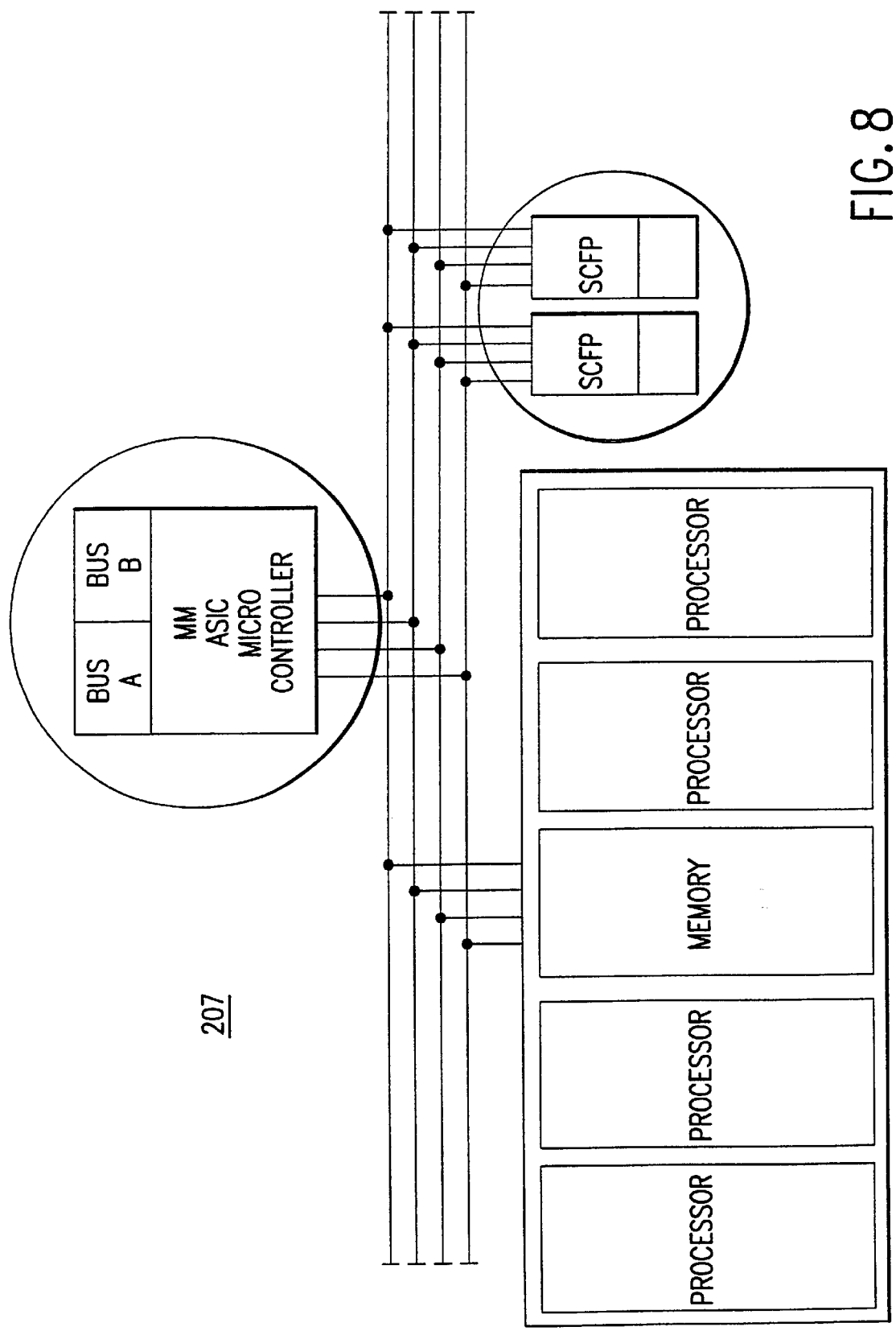
FIG. 8 shows a block diagram for a global storage controller system for the present invention.

Depicted in FIG. 8 is a function block diagram which is the Global Cache Controller system shown generally as 207. Collaboration with its tandem member is achieved through segmentation of tasks and Reflective Memory. Segmentation of tasks could include implementing a two-way interleaf for paged memory such that each Global Cache Controller is responsible for a single way in the two way interleaving approach.

There are two Global Cache Memory Buses. The Tandem Global Cache Controllers are on both buses. Each bus has a data path that is 32 bytes (256 bits) wide. Each of the two buses have 32 address lines and eight control lines. The 32 address lines allow 2TB to be addressed on each bus because the smallest addressable unit of memory is 512 bytes.

In preferred embodiments of the present invention, distributed architecture and hierarchical control and distributed cache and memory mapped storage become very important with larger systems.

The RAID write penalty occurs for RAID levels above level two. It significantly affects the performance of the system because of the extra overhead created by additional IO operations to support the parity. The extra IO operations needed include the party calculation and the write of parity. The parity calculation could require the read of the old data and the old parity. This approach has three additional IO operations for every write. This three for one write penalty is the overhead for single dimension parity.

Multidimensional parity has a greater overhead. Two additional IO operations are needed for each dimension. One to read the old parity and another to write the updated parity. A two dimensional parity would incur five additional IO operations and a three dimensional parity would incur seven additional IO operations.

Distributed CACHE and Memory Mapped Storage

A Global Memory is used for Memory Mapped Storage. Each line Card such as the various versions of Local Storage Controllers and Network Storage Controllers also have memory for buffering and caching IO operations. Most applications do not just request a write to be performed without first doing a read. Every real world application or environment has some level of sequential and deterministic aspects. How well the system finds and exploits this is a factor of the cache performance. The cache performance is delineated by read and write performance. Read performance is based on cache size; the system's ability to anticipate the next read and benefit of reusable IOs already in the cache.

Cache and Global Memory provide performance gains by allowing data to be pre read and post written. Most applications operate on a small subset of the total data during a specific time. This is known as "Locality of Reference". There are three aspects of Locality of Reference. They are Temporal Locality, Spatial Locality and Sequential Locality. Real world applications incur all three aspects of "Locality of Reference" to some degree. The larger the pool of memory and cache is, the larger the locality that can be exploited.

The large memory and cache pools also effect the write performance penalty of RAID parity. The per-read aspect of having the old data page in memory or cache is an IO operation that is not incurred again. Post write allows the delay of dealing with the parity overhead for writes so that if one or more write requests affects the same parity page the parity overhead is spread across all the writes instead of just one.

Distributed Architecture and Hierarchical Control

Incurring overhead in dealing with parity protection is one aspect of performance. Another is where and how a system incurs the overhead of additional IOs. The distributed architecture and hierarchical control allows the parity overhead to be limited by isolating or decoupling its effects on system performance.

Figure 9:
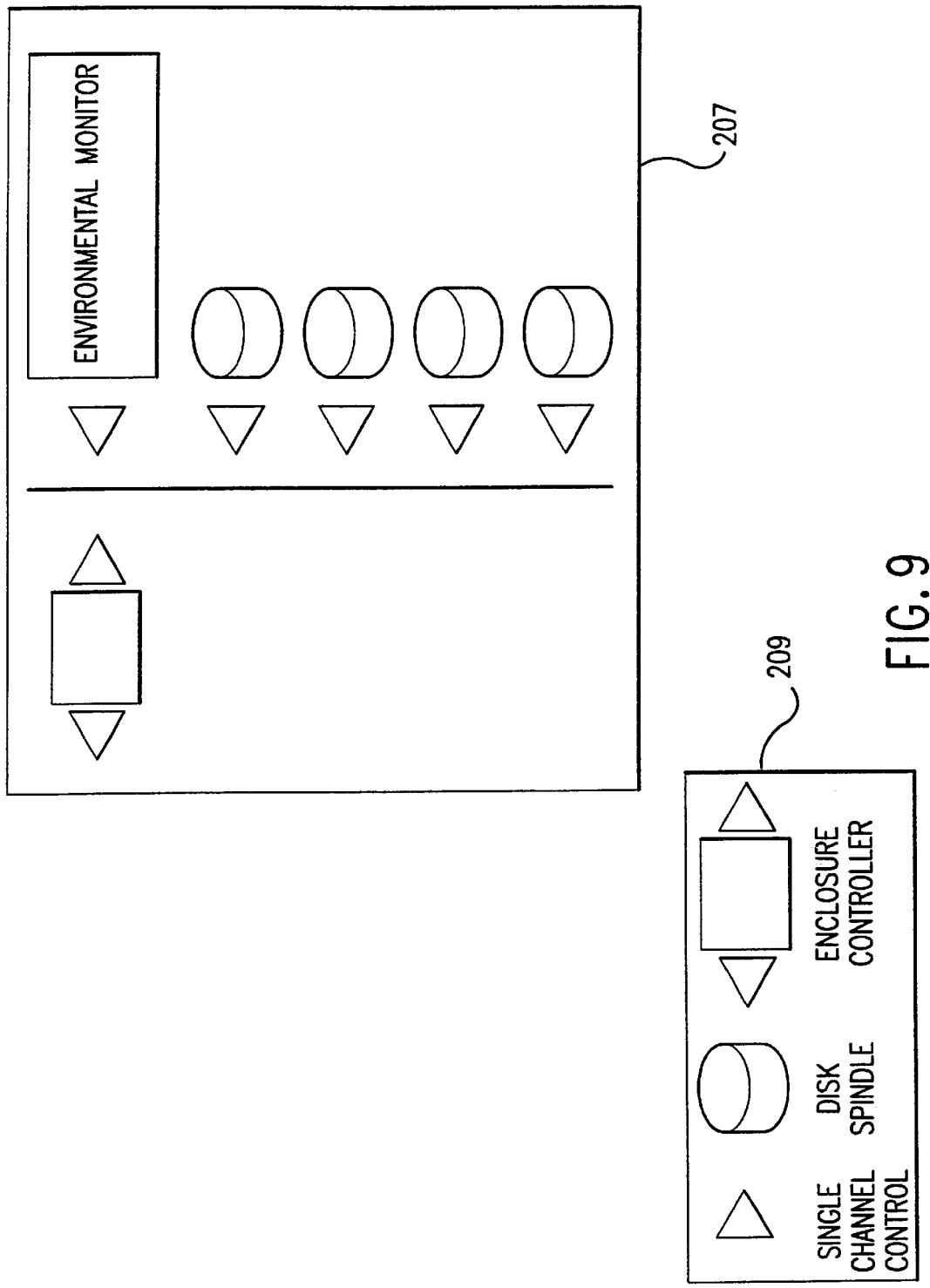
FIG. 9 shows a schematic diagram of a tray enclosure for distributed architecture hierarchical control for a present invention system with single channel controllers and disk spindles and, FIG. 10 shows a detailed schematic diagram of dynamic and static hierarchical control distributed intelligence used in the present invention system.

At the lowest level of hierarchical control, the tray enclosure has a two port controller. This is simply illustrated in FIG. 9 shown generally as diagram 207 with the legend 209 explaining each symbol. One port attaches to a bus that supports one or more disk drives and an Environmental Monitor. The other port attaches to one of the two buses in the Array Enclosure providing upstream connectivity. The tray controller also supports an option for XOR (Exclusive OR) writes. By sending the same difference record, which is the difference between the old data and the latest new data to all parity drives, for all dimensions of parity, the parity can be updated. This is accomplished by reading the old parity and XORing the difference record to obtain the new parity. This allows the system to incur the cost of the additional reads needed for parity without incurring their cost beyond the local disk drive.

Figure 10:
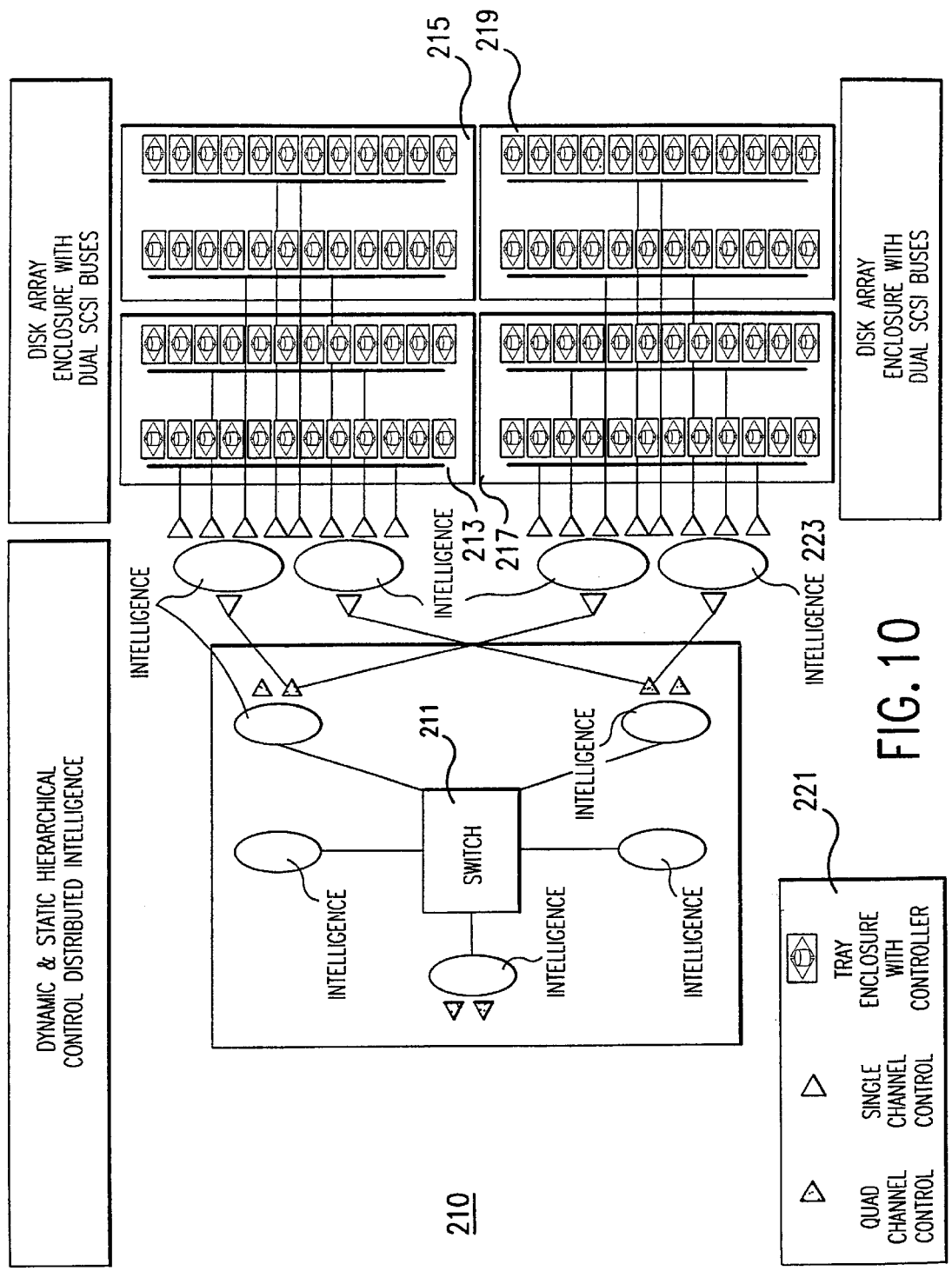

The cost of mirroring every parity drive is also absorbed by the distributed architecture and hierarchical control. FIG. 10 shows a more detailed diagram 210 with switch 211 and disk array enclosures 213, 215, 217 and 219. Legend 221 describes the symbols. An optional controller referred to as the "Remote Array Controller" and shown as, for example, intelligence processor 223 with its controllers connected thereto is inserted between the Local Storage Controller and the Disk Array Enclosure. This provides a means for implementing a STF (Silent Target Follower).

The drives or targets are packaged in enclosures containing 24 trays. Each tray holds one, two, three or four spindles to assume a virtual drive the aggregate of all. The virtual drive is a single target or LUN. The enclosures have two internal SCSI buses with 12 targets on each bus. Each target has two LUNs. The first LUN, LUN zero is for accessing the Environmental Monitor. The other LUN provides access to the virtual drive. Two enclosures can be mounted into a cabinet or rack. This puts 48 targets on four Ultra2 SCSI buses.

Since the Remote Array Controller is envisioned to be a single board with redundant Ultra2 SCSI initiators, fail over control will have to be upstream. The Remote Array Controller cards will need to have five ports, one of which should be Fibre Channel. Using a buddy approach with two Remote Array Controllers provides redundancy on the four buses with two initiators on each bus in the two enclosures and it provides two channels of Fibre channel upstream to Local Storage Controllers.

Deploying this arrangement with Remote Array Controllers between the targets and upstream controllers doubles the number of drives that can be reached by the Local Storage Controller. The Remote Array Controller can implement STF on the buses they are attached on without any write performance to their upstream controllers and the system. A single Remote Array Controller presents a channel of targets to its upstream controller.

Managment and control of the Remote Array Controller should be implemented with vendor specific extended SCSI commands. This should include downloading the processor or processors on the Remote Array Controller, health handshake and assume control of channel/targets. Implementing the model for processor devices (see SCSI-2 specification, section 12) could server this role of control.

If Remote Array Controllers are not used then two ports from two different Local Storage Controller must be connected to each internal bus within the Array Enclosure. This would provide the same level of fault tolerance while reaching only 25% of the total storage that Remote Array Controllers could with a single Local Storage Controller port. To excrete the cost of mirroring the embedded Tray Enclosure Controllers implement the concept of SLAVE. The Tray Enclosure Controller acting as a slave will perform the same write commands as the master for a single XOR write request on the channel to the master. This of course limits the participation for mirrors to devices on the same enclosure bus.

Domains

A domain like a rank defines the spindles that participate within its scope. This will include spindles for data, parity and hot spares. Unlike a rank a domain is user definable within limits and not bounded by any controller. In addition, a domain does not define bounds for participation in the creation of a LUN meaning that a LUN may span one or more domains. The domain does define the protection scheme for all is of its data drives.

| Model | 9100 | 9000 | 7100 | 7000 | 5100 | 5000 | 3100 | 3000 | 1100 | 1000 |
|---|---|---|---|---|---|---|---|---|---|---|
| TWO DIMENSIONAL PARITY MIRRORED | | | | | | | | | | |
| Dual Quad Controllers | 24 | 24 | 16 | 16 | 10 | 10 | 6 | 6 | 2 | 2 |
| Virtual Drives Total | 4608 | 1152 | 3072 | 768 | 1920 | 480 | 1162 | 288 | 384 | 96 |
| Domains | 12 | 4 | 8 | 4 | 4 | 3 | 4 | 2 | 3 | 2 |
| Drive Per Domain | 384 | 288 | 384 | 192 | 480 | 180 | 288 | 144 | 128 | 48 |

-continued

| Model | 9100 | 9000 | 7100 | 7000 | 5100 | 5000 | 3100 | 3000 | 1100 | 1000 |
|---|---|---|---|---|---|---|---|---|---|---|
| X Plane | 17 | 12 | 16 | 11 | 18 | 10 | 13 | 10 | 9 | 5 |
| Y Plane | 17 | 12 | 16 | 11 | 18 | 10 | 13 | 10 | 9 | 5 |
| Data Drives | 289 | 144 | 256 | 121 | 324 | 100 | 169 | 100 | 81 | 25 |
| Parity | 68 | 48 | 54 | 44 | 72 | 40 | 52 | 40 | 36 | 20 |
| Used Drives Per Domain | 357 | 192 | 320 | 165 | 396 | 140 | 221 | 140 | 117 | 45 |
| Spares Per Domain | 27 | 96 | 64 | 27 | 84 | 20 | 67 | 4 | 11 | 3 |
| Total Spares | 324 | 384 | 512 | 108 | 336 | 60 | 258 | 8 | 33 | 6 |
| Overhead | 19.05% | 25.00% | 20.00% | 26.67% | 18.16% | 28.57% | 23.53% | 28.57% | 30.77% | 44.44% |
| Failures | 48 | 16 | 32 | 16 | 16 | 12 | 16 | 8 | 12 | 8 |
| THREE DIMENSIONAL PARITY MIRRORED | | | | | | | | | | |
| Dual Quad Controllers for Drives | 24 | 24 | 16 | 16 | 10 | 10 | 6 | 6 | 2 | 2 |
| Virtual Drives Total | 4606 | 1152 | 3072 | 768 | 1920 | 480 | 1152 | 288 | 384 | 96 |
| Domains | 8 | 6 | 6 | 2 | 4 | 2 | 2 | 1 | 2 | 1 |
| Virtual Drive Per Domain | 576 | 192 | 512 | 384 | 480 | 240 | 576 | 288 | 192 | 96 |
| X Plane | 6 | 4 | 6 | 5 | 6 | 4 | 6 | 5 | 4 | 3 |
| Y Plane | 6 | 4 | 6 | 5 | 6 | 4 | 6 | 5 | 4 | 3 |
| Z Plane | 6 | 4 | 6 | 5 | 6 | 4 | 6 | 5 | 4 | 3 |
| Data Drives | 216 | 64 | 216 | 125 | 216 | 64 | 216 | 125 | 64 | 27 |
| Parity | 216 | 96 | 216 | 150 | 216 | 96 | 216 | 150 | 96 | 54 |
| Used Drives Per Domain | 432 | 160 | 432 | 275 | 432 | 160 | 432 | 275 | 160 | 81 |
| Spares Per Domain | 144 | 32 | 80 | 109 | 48 | 80 | 144 | 13 | 32 | 15 |
| Total Spares | 1152 | 192 | 480 | 218 | 192 | 160 | 288 | 13 | 64 | 15 |
| Overhead | 50.00% | 60.00% | 50.00% | 54.55% | 50.00% | 60.00% | 50.00% | 54.55% | 60.00% | 66.67% |
| Failures | 48 | 36 | 36 | 12 | 24 | 12 | 12 | 6 | 12 | 6 |

Conclusion on Mirrored MPD

The majority of the performance cost of doing either two-dimensional mirrored parity or three-dimensional mirrored parity is mitigated by the approaches in exploiting the distributed architecture. The cost of channel contention has not been considered. Additionally, the difference between two and three dimensional mirrored parity is storage overhead and protection required; this should be a user option.

Obviously, numerous modifications and variations of the present invention are possible in light of the above teachings. It is therefore understood that within the scope of the appended claims, the invention may be practiced otherwise than as specifically described herein.

What is claimed is:

1. A data storage system for multidimensional parity protection of at least three dimensions, comprising:

(a) a housing for containing a plurality of $N^a$ conventional disk drives, wherein $N^a$ is the number of disk drives and N is greater than two, and a is an integer of at least three, representing the dimensionality of parity protection;

(b) a plurality of at least $N^a$ conventional data disk drives for storing data located within said housing;

(c) a plurality of parity disk drives sufficient in number to provide mirrored, multidimensional, orthogonal parity arrays in at least three dimensions, and equal in number to $2aN^c$, wherein a is as defined above, and c is a−1, and wherein each of said conventional data disk drives is linked to at least a number of parity disk drives equal to a, and wherein said plurality of parity disk drives are mirrored for guarding data stored on said data disk drives in a mirrored parity arrangement, each of said conventional data disk drives thereby having a multidimensional parity relationship with at least four of said parity disk drives such that multidimensional, mirrored, orthogonal parity arrays of a dimensionality are established for each of said conventional disk drives and each of said conventional disk drives are related to at least two parity disk drives in each a dimension, thereby establishing a parity group for that conventional disk drive and other conventional disk drives sharing said same at least two parity disk drives in each a dimension;

(d) data reconstruction means coupled to each of said multidimensional, mirrored orthogonal parity arrays for reconstructing data from any failed conventional disk drive in a given dimensional parity group by combining data from other of said conventional disk drives and parity disk drives in its orthogonal parity arrays;

(e) a plurality of first processors at a first level connected directly to said plurality of control cards, said first processors having control and processing intelligence;

(f) a plurality of second processors at a second level connected indirectly to said plurality of control cards, said first processors having control and processing intelligence; and, (g) sufficient software, memory and hardware within said processors to establish both dynamic and static hierarchical control of said plurality of parity disk drives using distributing intelligence.

2. The data storage system of claim 1 further includes a plurality of control cards, each of said controller cards generating a plurality of channels, each channel being coupled to said data disk drives and said parity disk drives for accessing information therefrom and sending information thereto, at least one controller card being coupled to a channel for receiving access commands from at least one host computer and for selecting channels from among said plurality of channels to execute said access commands.

3. The data storage system of claim 2 wherein a collection of controllers provides access and control over a collection of disks, each of said data disk drives belonging to a parity relation in each dimension constructed.

4. The data storage system of claim 1 wherein there are a plurality of $N^3$ conventional disk drives and a plurality of $6N^2$ parity disk drives to establish mirrored three dimensional, orthogonal parity arrays.

5. The data storage system of claim 1 wherein said controller cards are contained within a plurality of tray enclosures, each of said plurality of tray enclosures having at least one controller with at least two-ports, one port of which is connected to a bus connected to one or more disk drives and another port of which is connected to an environmental monitor contained within said tray enclosure for controlling and managing comparative data between old data and current data from the conventional disk drives to the plurality disk drives for parity updating.

6. A data storage system for multidimensional parity protection of at least three dimensions for connection to a plurality of conventional disk drives equal in number to $N^a$, wherein $N^a$ is the number of disk drives and N is greater than two, and a is an integer of at least three, representing the dimensionality of parity protection for retrofit connection to a plurality of conventional data disk drives, which comprises:

(a) a plurality of parity disk drives sufficient in number to provide mirrored, multidimensional, orthogonal parity arrays in at least three dimensions, and equal in number to $2aN^c$, wherein a is as defined above, and c is a−1, and wherein each of said conventional data disk drives is linked to at least a number of parity disk drives equal to a, and wherein said plurality of parity disk drives are mirrored for guarding data stored on said data disk drives in a mirrored parity arrangement, each of said conventional data disk drives thereby having a multidimensional parity relationship with at least four of said parity disk drives such that multidimensional, mirrored, orthogonal parity arrays of a dimensionality are established for each of said conventional disk drives and each of said conventional disk drives are related to at least two parity disk drives in each a dimension, thereby establishing a parity group for that conventional disk drive and other conventional disk drives sharing said same at least two parity disk drives in each a dimension;

(b) connection means for functionally connecting said parity disk drives to said conventional data disk drives;

(c) data reconstruction means coupled to each of said multidimensional, mirrored orthogonal parity arrays for reconstructing data from any failed conventional disk drive in a given parity group by combining data from other of said conventional disk drives and parity disk drives in its orthogonal parity arrays;

(d) a plurality of controller cards for providing access and control over a collection of disks;

(e) a plurality of intelligence for parity calculation in each dimension;

(f) a plurality of first processors at a first level connected directly to said plurality of control cards, said first processors having control and processing intelligence;

(g) a plurality of second processors at a second level connected indirectly to said plurality of control cards, said first processors having control and processing intelligence;

(h) a plurality of third processors at a third level having intelligence, said third processors being connected to at least one of said plurality of first processors and said plurality of second processors; and, (i) sufficient software, memory and hardware within said processors to establish both dynamic and static hierarchical control of said plurality of parity disk drives using distributing intelligence.

7. The data storage system of claim 6 wherein each of said controller cards generating a plurality of channels, each channel being coupled to said data disk drives and said parity disk drives for accessing information therefrom and sending information thereto, at least one controller card being coupled to a channel for receiving access commands from at least one host computer and for selecting channels from among said plurality of channels to execute said access commands.

8. The data storage system of claim 7 wherein a first controller card controls and calculates linear connection in a first dimension and wherein a second controller card controls and calculates linear connection in a second dimension and wherein a third controller card controls and calculates linear connection in a third dimension, said first, second and third controllers being linked to other said controller cards so as to permit mirrored multidimensional orthogonal parity array data transmission between said data disk drives and said parity disk drives.

9. The data storage system of claim 7 wherein said controller cards are contained within a plurality of tray enclosures, each of said plurality of tray enclosures having at least one controller with at least two-ports, one port of which is connected to a bus connected to one or more disk drives and another port of which is connected to an environmental monitor contained within said tray enclosure for controlling and managing comparative data between old data and current data from the conventional disk drives to the plurality disk drives for parity updating.

10. The data storage system of claim 6 wherein there are a plurality of at least $N^3$ conventional disk drives and a plurality of at least $6N^2$ parity disk drives.

* * * * *